T. LANSTON.
CONTROLLER COMPOSING MACHINE.
APPLICATION FILED MAR. 29, 1905.
952,621.
Patented Mar. 22, 1910.
10 SHEETS—SHEET 4.
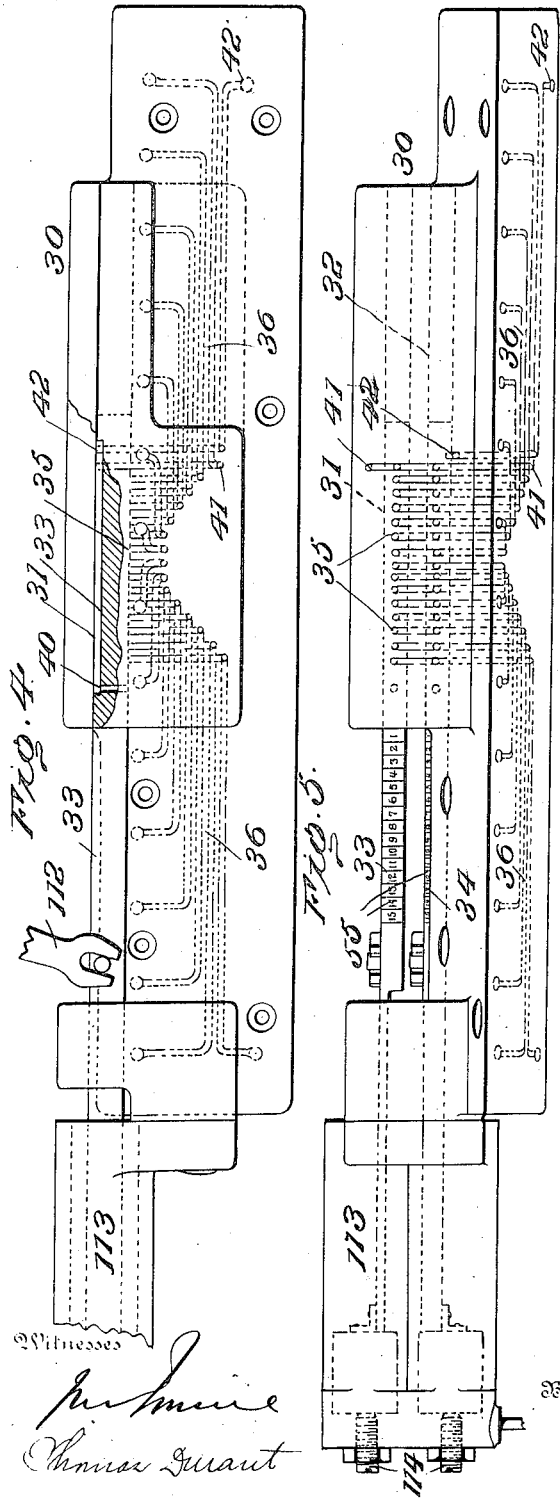
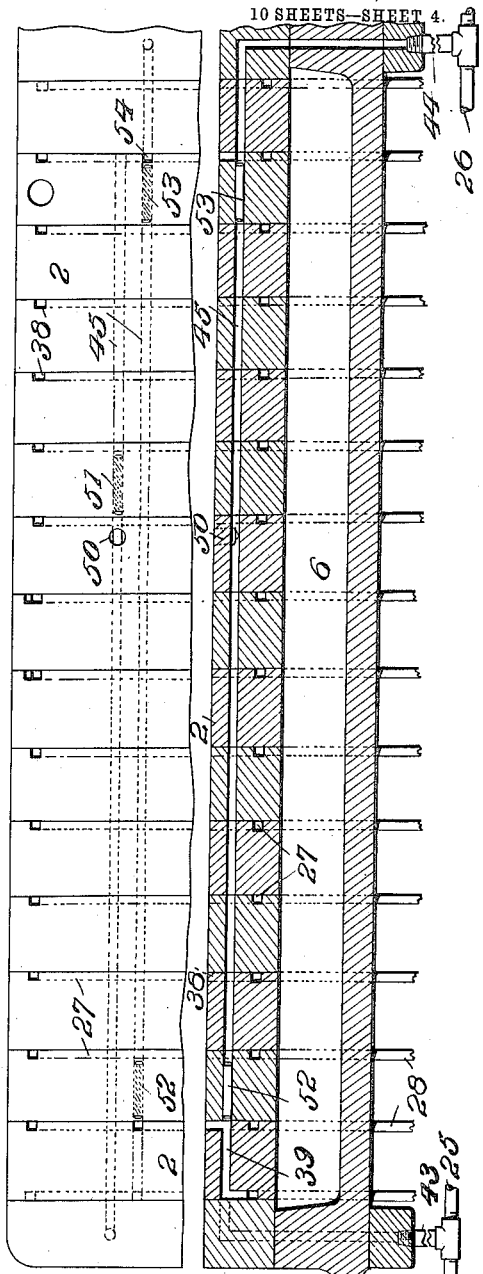
Witnesses
Inventor
Tolbert Lanston
Church & Church Attorneys

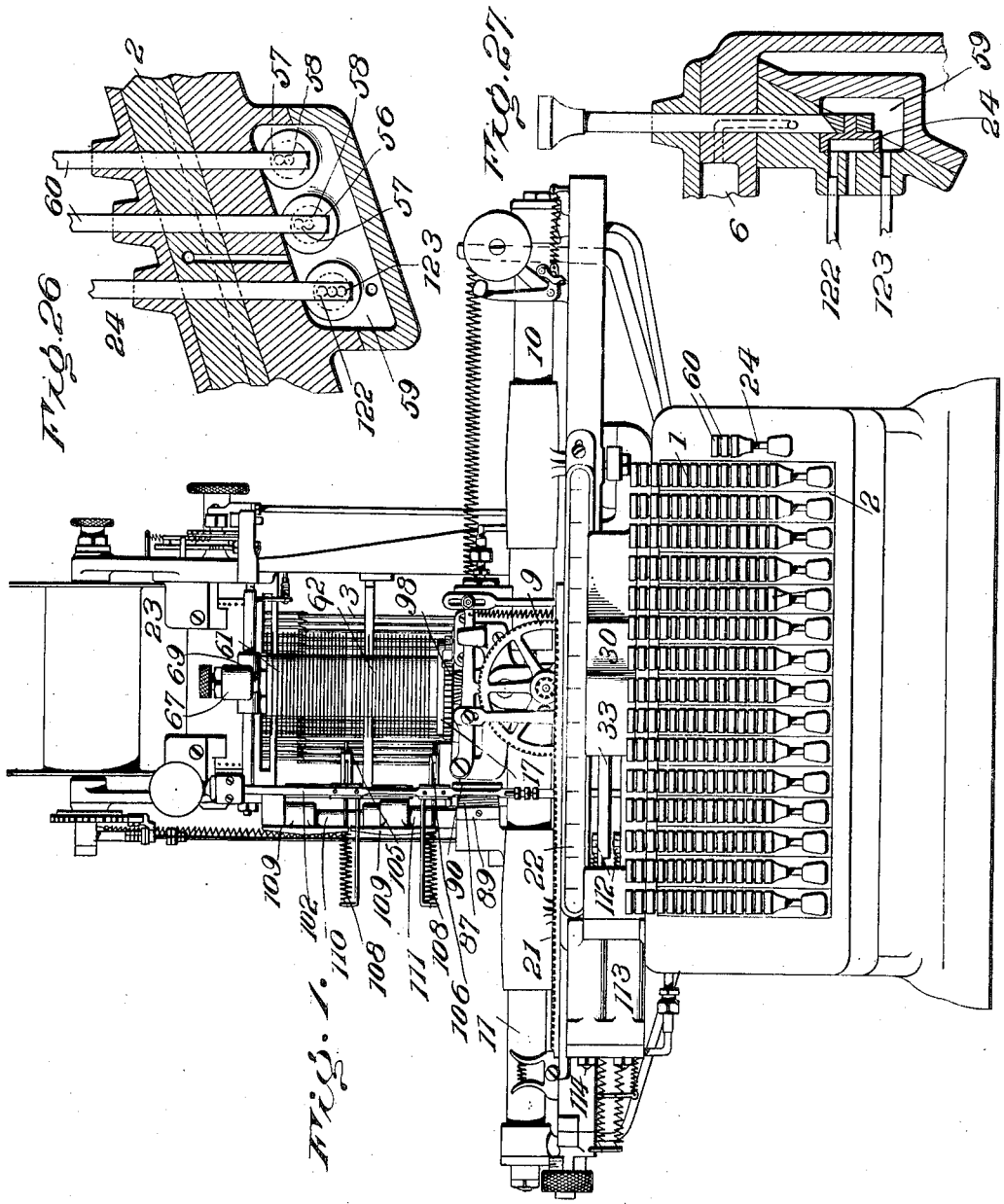

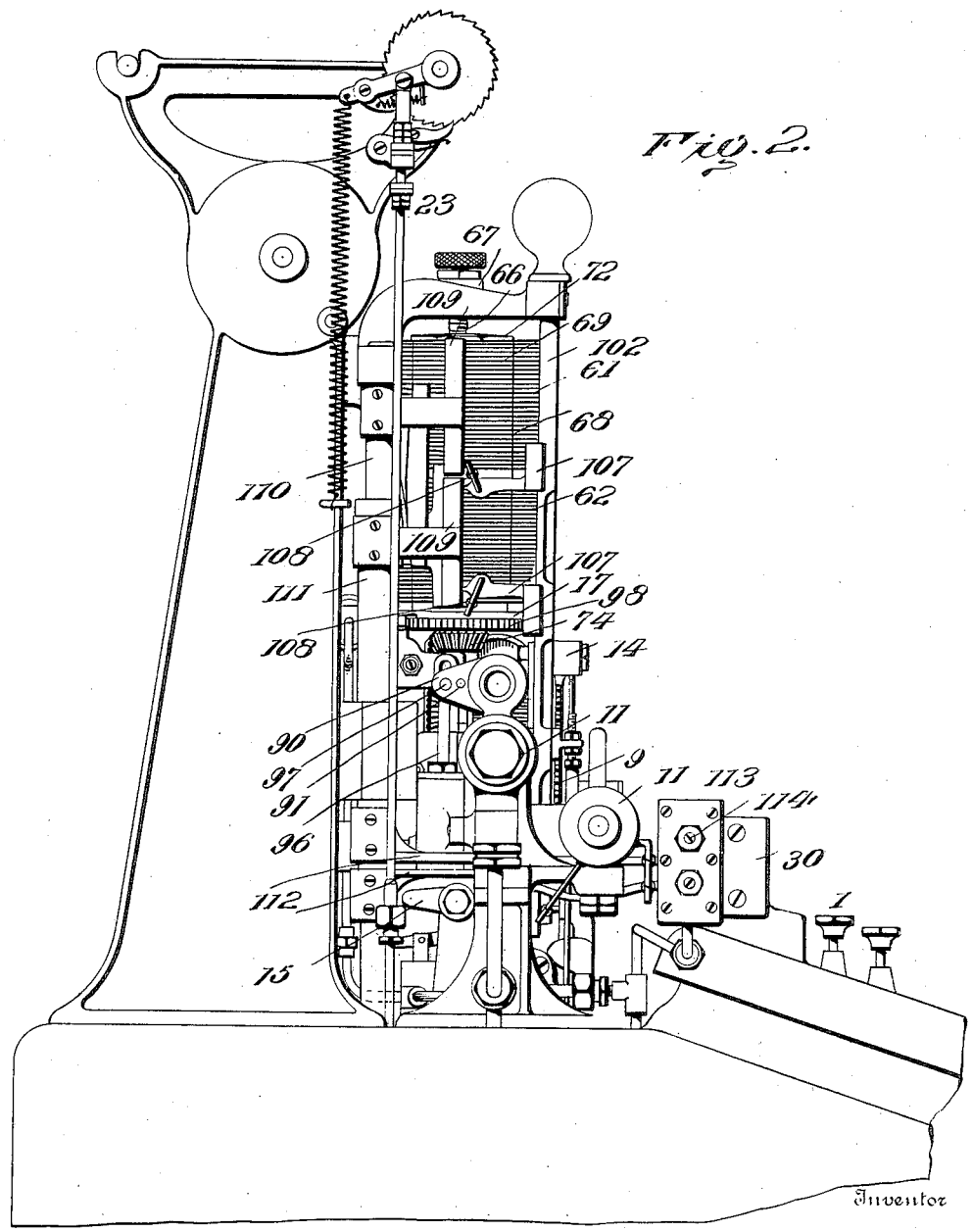

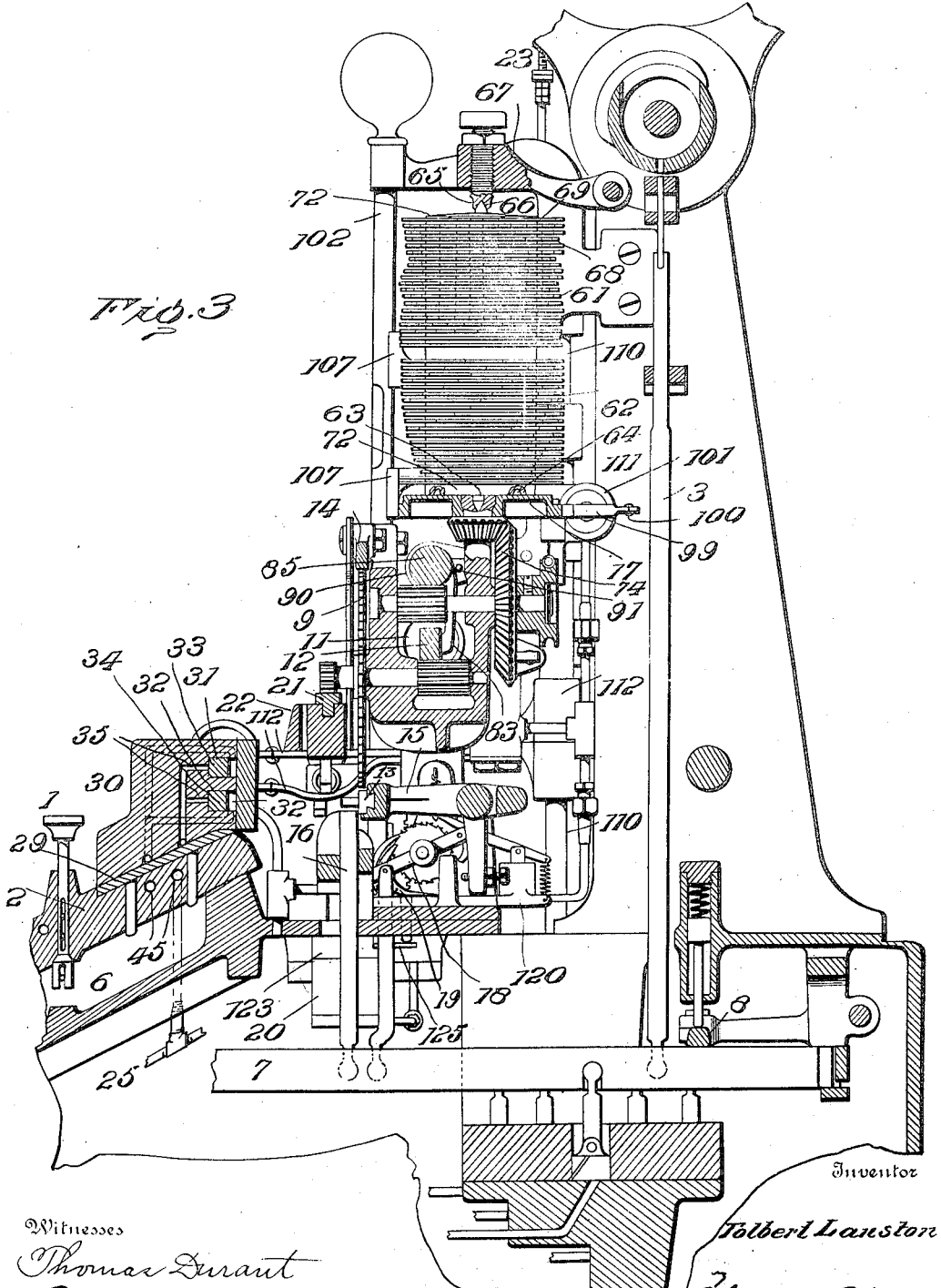

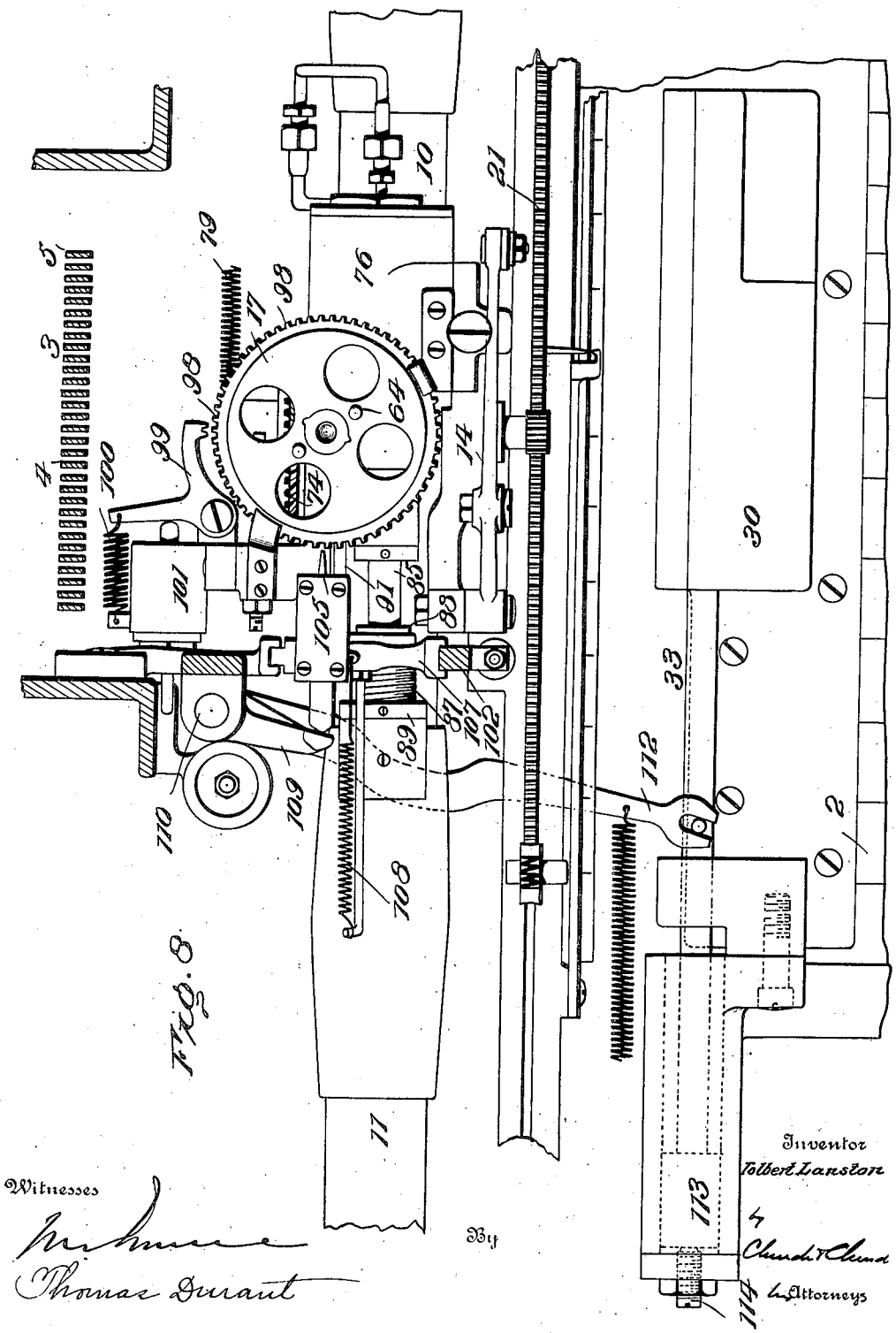

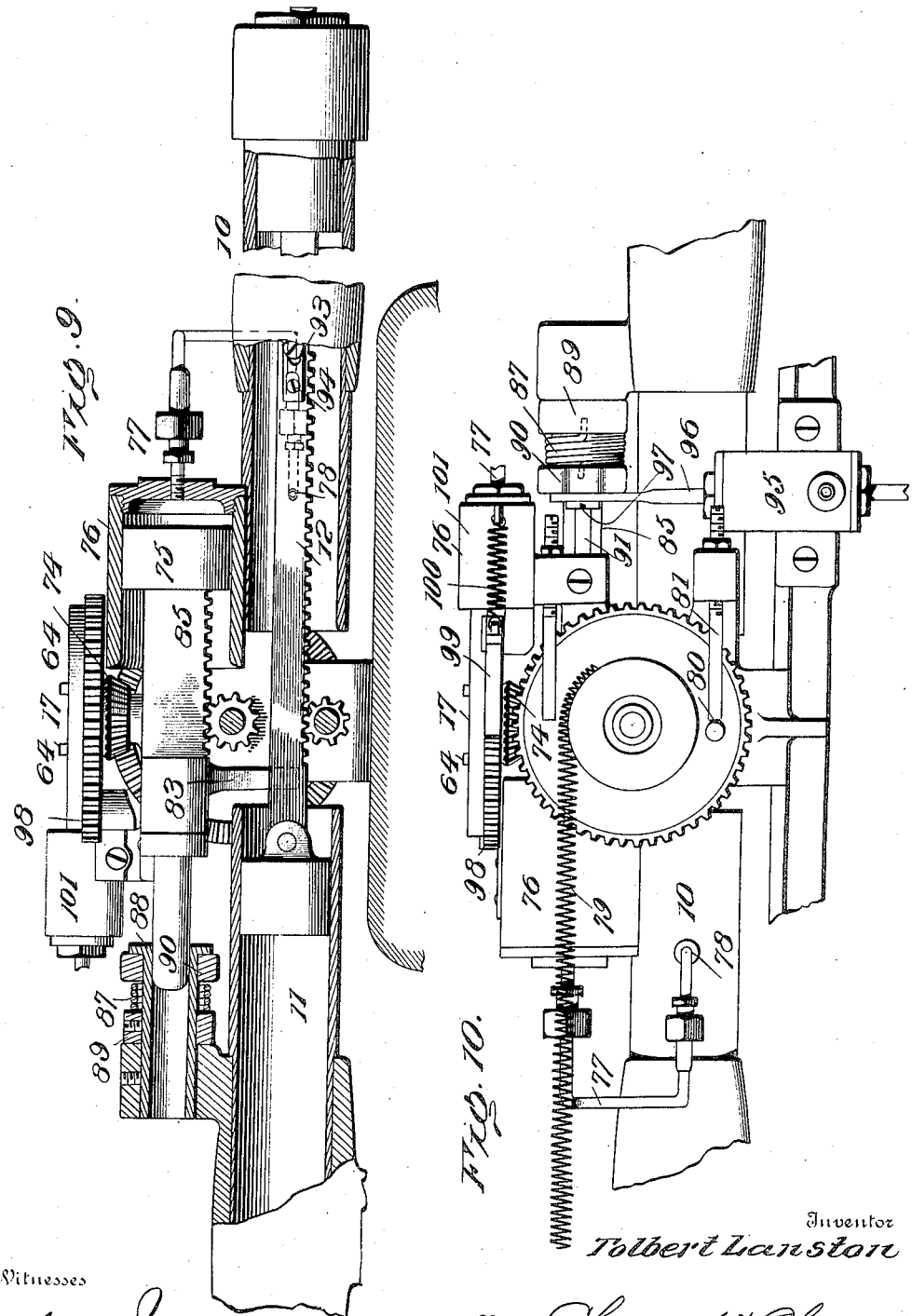

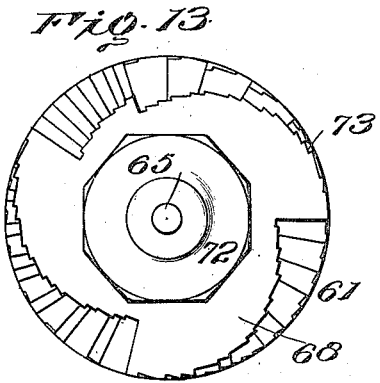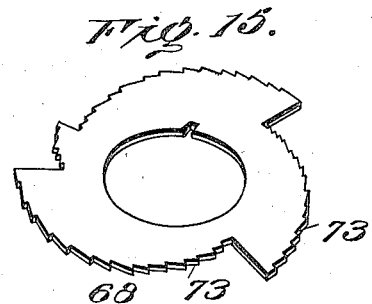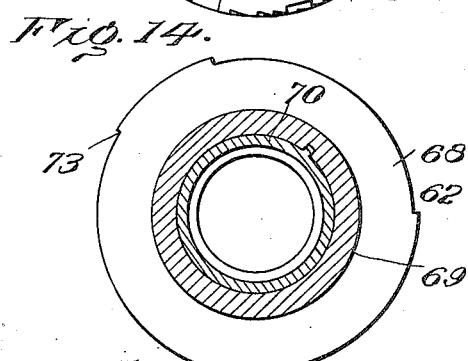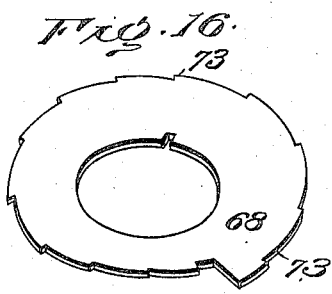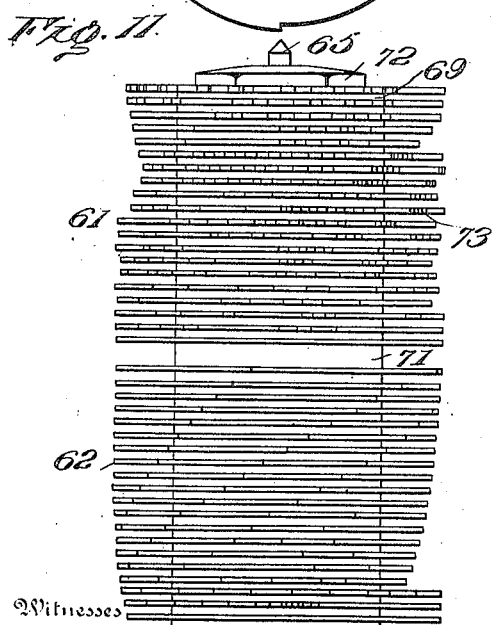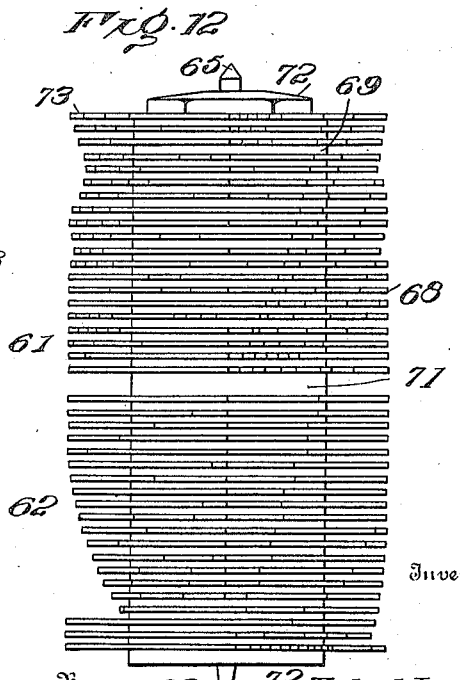

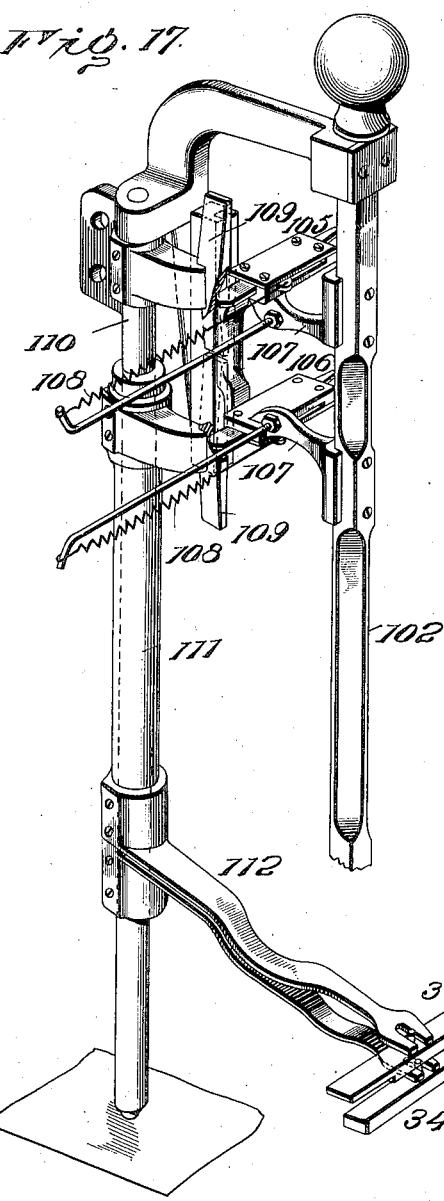
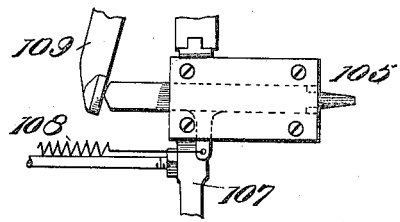
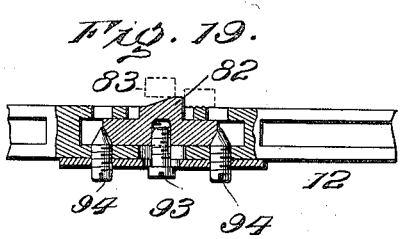
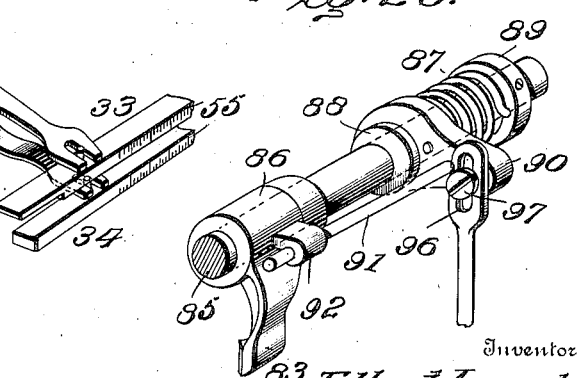

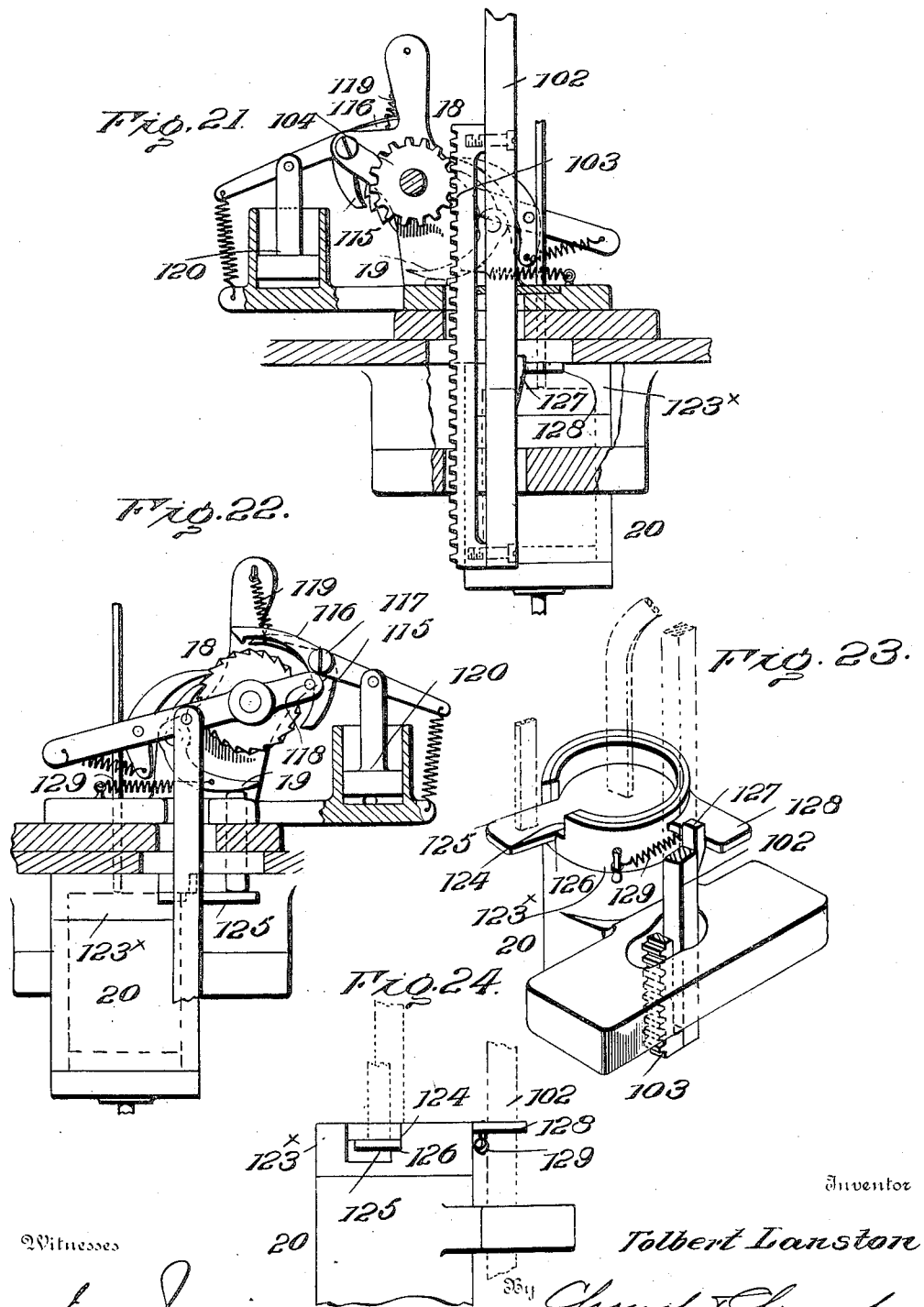

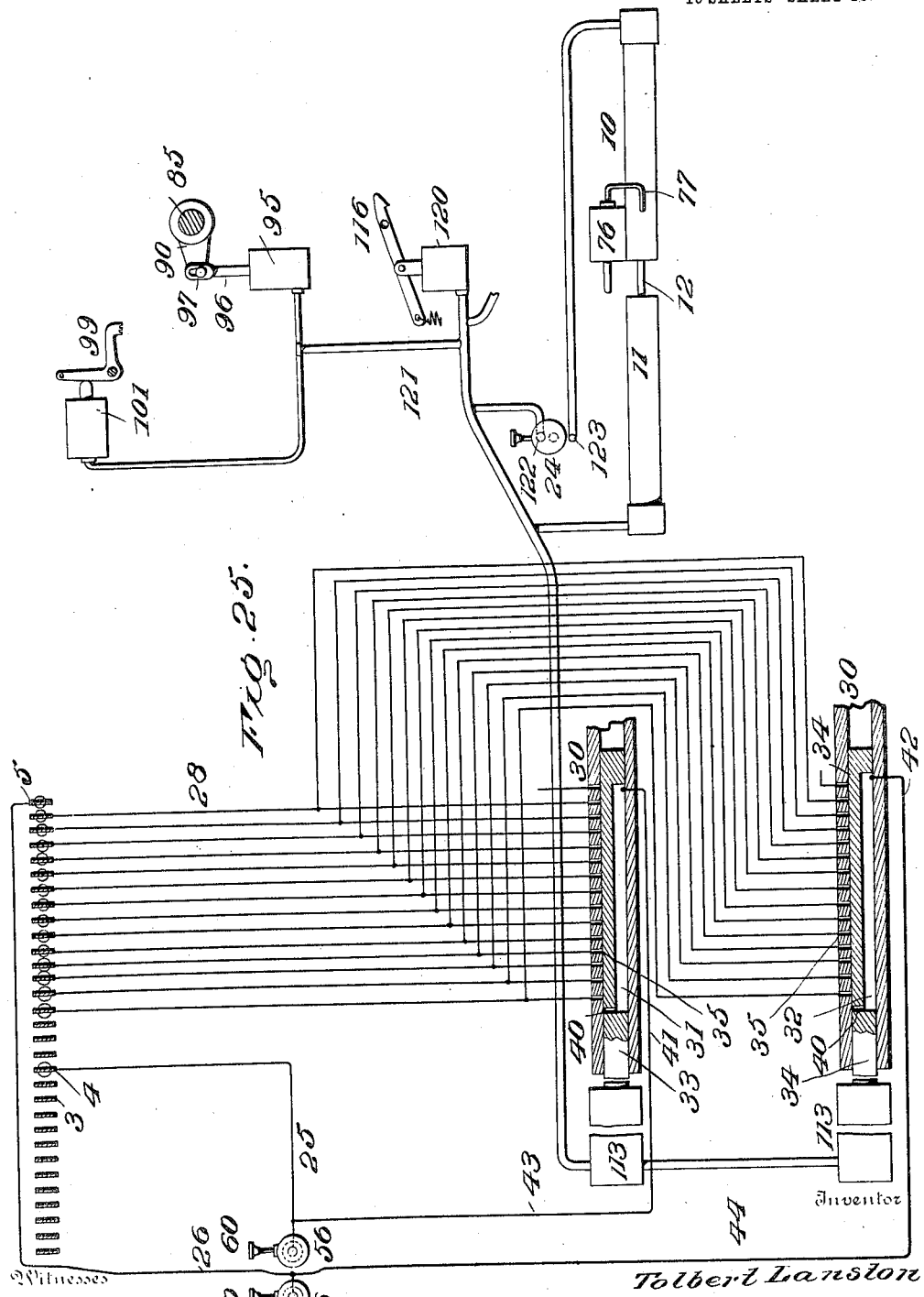

UNITED STATES PATENT OFFICE.

TOLBERT LANSTON, OF WASHINGTON, DISTRICT OF COLUMBIA, ASSIGNOR TO LANSTON MONOTYPE MACHINE COMPANY, OF PHILADELPHIA, PENNSYLVANIA, A CORPORATION OF VIRGINIA.

CONTROLLER COMPOSING-MACHINE.

952,621.  Specification of Letters Patent.  Patented Mar. 22, 1910.

Application filed March 29, 1905. Serial No. 252,686.

*To all whom it may concern:*

Be it known that I, TOLBERT LANSTON, of Washington, in the District of Columbia, have invented certain new and useful Improvements in Controller Composing - Machines; and I do hereby declare the following to be a full, clear, and exact description of the same, reference being had to the accompanying drawings, forming a part of this specification, and to the figures of reference marked thereon.

This invention relates to improvements in or upon composing machines of the class employed in the preparation of mechanical controllers or record strips for governing the action of type casting, setting and analogous machines. Machines of this class as heretofore constructed and used have been equipped with a justification indicator for designating to the operator the keys necessary to be operated at the end of each line of composed matter in order to produce the justification signal appropriate thereto. The indications thus given were visual only, hence correct composition was dependent upon close observation, accurate reading and intelligent selection on the part of the operator, all of which involves a consumption of time and energy, besides serving to divert the attention of the operator from the subject matter being composed.

Now the present invention has for its principal object to provide means whereby the selection of the justification signals will be automatically effected, to the end that the operator may be relieved from all responsibility with relation thereto other than the bringing of the selected signal producing devices into action; and, further, to so construct and arrange the mechanism that the justification signals may be produced while the measuring mechanism is being reset or returned to zero position preliminary to the composition of the next succeeding line, thereby materially increasing the capacity of the machine.

To these ends the invention consists in equipping the machine for producing the type signals with a mechanical index and automatic reader controlled by the line measuring and space registering mechanisms thereof and acting upon or through a signal selecting system to designate and bring into operative relation the signal producing media corresponding in value with the ascertained deficiency of the line divided by the number of space type contained in the line, all as hereinafter more fully described, the novel features being pointed out in the claims.

In the accompanying drawings illustrating a preferred form of embodiment specially adapted to a composing machine of well known construction—Figure 1 is a front elevation of the machine with the improvements applied thereto. Fig. 2 is a left hand end elevation of the rear upper section of the machine. Fig. 3 is a partial vertical section. Fig. 4 is a top plan view and Fig. 5 a front elevation of the valve mechanism forming part of the selective system. Fig. 6 is a top plan view and Fig. 7 a vertical section through the key plunger bars as adapted for the reception of the valve mechanism, Figs. 5 and 6. Fig. 8 is a top plan view, partly in section, of the index carrier, line measuring mechanism, justification signal selecting system and automatic reader. Fig. 9 is a longitudinal section through the motor and motor-return cylinders showing the auxiliary motor for the index carrier and the line gaging devices. Fig. 10 is a rear elevation of the index carrier with its actuating and positioning or gaging devices. Figs. 11 and 12 are side elevations of the duplex mechanical index taken from different view points. Fig. 13 is an end view and Fig. 14 a transverse section of the mechanical index. Figs. 15 and 16 are perspective views of some of the disks which go to form the index. Fig. 17 is a perspective view of the automatic reader. Fig. 18 is a top plan view of one of the feelers with its supporting and adjusting devices and pusher. Fig. 19 is a sectional view of a portion of the motor-rack showing the abutment or gage block applied thereto. Fig. 20 is a detail view of the gage arm coupled with the index carrier and connections for withdrawing the same. Fig. 21 is a side elevation of the space registering mechanism with the feeler bar and locking devices. Fig. 22 is a view of the space registering devices taken from the opposite side of Fig. 21, the feeler bar being omitted. Fig. 23 is a perspective view of the resetting motor and connections for the holding pawls, showing the locking device. Fig. 24 is a detail of the locking device for the holding pawl actuating mechanism. Fig. 25 is a diagrammatic view showing the connections between the several motor devices and control valves. Fig. 26 is a detail view showing in longitudinal section the control valves of the resetting and justification keys. Fig. 27 is a transverse vertical section through the resetting valve of Fig. 26.

The same numerals occurring in the several figures designate like parts.

Although applicable to other forms of composing machines the principle of the new automatic justification signal selecting mechanism is herein illustrated in its preferred form in connection with and as specially adapted to the keyboard perforator of Patent No. 654,115, dated July 17, 1900, as modified and improved in accordance with Patents Nos. 828,449 and 828,470, dated August 14, 1906. The means for selectively actuating the punches, singly or in combinations, to produce the type signals, for supporting and feeding the record strip, for measuring the line as composed, for effecting successive advances of a member each time a justifying space signal is produced, and for releasing the line measuring and space registering mechanisms and restoring them to initial position—all these are substantially the same as in the machine of the prior patent and applications mentioned, with the exception of the means for engaging the position of the justification index carrier relative to the line measuring mechanism.

It will suffice for present purposes to designate certain of the principal elements of the prior machine which are retained, such as the series of valved finger keys 1 with their plunger bars 2; the series of punch bars 3, including the two special justification designating punch bars 4 and 5; the pressure chamber 6; punch levers 7; rocking frame 8 controlling the paper feed valve; units wheel 9; motor cylinder 10; motor return cylinder 11; motor rack 12; units rack 13; units wheel retaining pawl 14; units rack carrier 15; series of stop bars 16 for admeasuring the movements of the units rack when in engagement with the units wheel; justification index carrier 17; space registering ratchet mechanism 18; space ratchet holding pawl 19; tripping motor 20 for releasing pawls 14 and 19; line rack 21; line scale 22; paper feed mechanism 23; and resetting valve 24 for reversing pressure in the motor and motor-return cylinders. In addition to the foregoing the prior machine was provided with two transverse rows of justification keys, the keys of each row controlling a duct leading to the designating punch 4 or 5 corresponding therewith, and each key also controlling one of a series of ducts leading to the dimensioning punches, while the index carrier was equipped with a charted cylinder coöperating with a pointer controlled by the space registering mechanism. The index was charted to show at the points of intersection of the two movements derived from the line measuring and the space registering mechanisms, symbols designating the two justification keys (one in each row) necessary to produce the justification signal for the line. Correct observation and selective action on the part of the operator was essential to the production of justified composition, and it is one of the principal objects of this invention to eliminate certain of these features and the errors incident thereto by the substitution for the justification keys and visual index of a mechanical index, an automatic reader therefor and a selective system under the control of said reader.

By reference to Patent No. 654,115, it will be seen that all the valves of each transverse row of justification keys controlled the admission of pressure into a duct common to the row and communicating through a pipe 25 or 26 with the cylinder of the designating punch 4 or 5 appropriated thereto, and, further, that the valves of each vertical row in like manner controlled the admission of pressure to one of a series of ducts 27 communicating through pipes 28 with the series of dimensioning punches. With a view to adapting the present improvements thereto the valves and keys of the two upper or justification rows are omitted or removed, the holes in the key bars plugged, and the upper faces of said bars dressed off to provide a seat for a plate or packing block 29 to form a base for the attachment of a removable frame 30 containing the operating members of the selecting system. This frame 30, best seen in Figs. 4 and 5, and diagrammatically in Fig. 25, is provided with two valve chambers 31, 32, containing slide valves 33, 34, and each provided with a plurality of ports 35 equally spaced and serially disposed in the line of motion of the valve. Corresponding ports 35 of the two series are connected together and to one of the series of ducts 27 through the medium of passages 36 formed in the frame 30, the first port of each series being connected with the duct 27 of the first or left hand column of keys, representing the dimensioning punch of least value, the second port with the duct of the second column of keys representing the punch of next higher value and so on throughout the series.

Communication is effected between the passages 36 and ducts 27 by means of holes 38 bored through the key bars into said ducts and registering with the passages 36 in frame 30. This is true of all the ducts excepting that pertaining to the first port 35 and duct 27, whose passage 36 terminates just above the duct 27 of the second column of keys, and is connected with the first duct 27 of the series by a passage 39 formed in the first key bar. This arrangement which involves the locating of the discharge ends of the first two passages 36 in the same transverse section of the frame 30, has been adopted merely with a view to shortening the attachment, as otherwise the first passage 36 might be extended to a point immediately above the first duct 27 and connected thereto by a vertical passage in the key bar in the same way that the other passages are connected with their respective ducts.

Each valve 33, 34, normally covers and closes the series of ports 35 pertaining to its valve chamber, and is provided with a port 40 in alinement with said series, so that as the valve is advanced beyond its normal or zero position, the ports 35 will be consecutively uncovered. Pressure is admitted to the chambers 31, 32, in rear of their valves 33, 34, through separate passages or ducts 41, 42, formed in the frame 30. Supply passage 41 of valve 33 connects through branch pipe 43 with pipe 25 leading from one of the justification valves to the designating punch bar 4, while supply passage 42 in like manner connects through branch pipe 44 with the pipe 26 leading from the other justification valve to designating punch bar 5, from which it results that when either justification valve is operated pressure will be admitted through its pipe 25 or 26 to the corresponding valve chamber 31 or 32 and designating punch 4 or 5, thereby bringing into action the dimensioning punch selected by valve 33 or 34 in conjunction with the designating punch 4 or 5 pertaining thereto, to form one of the two justification signals required. Advantage is taken of the presence of the transverse ducts 45 in the key bars 2 pertaining to the two rows of justification keys of the prior machine in effecting communication between supply pipes 25 and 26 and passages 41 and 42 as follows: An opening 50 communicating with the upper duct 45 connected to supply pipe 25 and registering with passage 41 is formed in one of the key plunger bars 2 and the duct is closed beyond said opening by a plug 51. The lower duct 45 is closed near one end by a plug 52, to form passage 39, and near the opposite end by a plug 53, and between the latter and supply pipe 26 an opening 54 is provided in register with passage 42. The arrangement of valves 33, 34, relative to the series of ports 35 controlled thereby is such that when the valve is retracted or in normal position pressure entering through supply passage 41 or 42 will be prevented from entering either of the ports communicating with pipes 28, hence none of the series of dimensioning punches will be operated, but when the valve is advanced or adjusted through one or more degrees of movement, the port 35 whose position corresponds with the degree of movement imparted to the valve will be uncovered and the dimensioning punch corresponding in value therewith will be operated. The stems of valves 33, 34, may be graduated and marked as at 55, Fig. 5, to indicate which of the series of ports is uncovered in different positions of adjustment. In the present instance fifteen different positions or degrees of adjustment are provided (although fourteen would suffice, inasmuch as the signal for the fifteenth degree is formed by the designating punch alone without any dimensioning perforation) the last or fifteenth port communicating with the motor of a punch bar unprovided with a punch, as in the prior machine.

The devices for separately controlling the admission of pressure to pipes 25 and 26 are duplicates and each comprises a valve 56 (Fig. 26) coupled with an actuating key 60 and normally connecting a supply port 57 and an exhaust port 58, the former communicating with pipe 25 or 26. The valves are located in a chamber 59 in open communication with pressure chamber 6, and are so arranged and proportioned that when either is displaced it will uncover port 57 without uncovering port 58, thereby admitting pressure to the operating devices or motors of the designating and selected dimensioning punches; and upon the release of the key the pressure upon the stem of the valve will return the latter to initial position.

The mechanism thus far described constitutes a selective system for the justification designating and dimensioning punches which is capable of either manual or automatic control, but is specially designed for the latter. Thus, when employed in connection with the charted index of the prior machine referred to, the valves 33, 34, can be manually shifted to the positions shown by the index reading, and by pressing the justification keys 60 in the proper sequence, the justification signals for the line will be formed, it being understood that a feed of the paper is effected each time one or more punch bars is or are operated. But the selective system is specially designed and adapted to operate in conjunction with a mechanical index and automatic reader such as next described.

The mechanical index comprises a plurality of series of bearings in parallel relation, the members of each series precalculated to represent by their distance from a common datum line, the degree of movement to be imparted to the member of the selective system, when brought into proper relation thereto, required to bring into action that one of the dimensioning punches corresponding with the justifying fraction to be added to the justifying type. A single mechanical index is employed for each justification signal, but as the present machine is designed to produce two justification signals for each line of composition, to govern separate adjusting devices the sum of whose adjustments constitutes the justification fraction, two such indexes 61, 62 are provided, the one coöperating with valve 33 and the other with valve 34. In the present instance the two mechanical indexes are arranged one above the other and are adapted to replace the charted index of the prior machine, to which end one head of this duplex index is provided with a center 63 engaging a center bearing in the carrier 17 and with sockets to receive the pins 64 of said carrier, while the opposite head is furnished with a center pin 65 engaging a longitudinally adjustable bearing 66 carried by a bracket 67 on the paper tower. Each index 61, 62, is composed of a series of disks 68 of uniform thickness with interposed washers 69 for spacing them equally, said plates and washers being centrally perforated and notched to accurately fit a splined shaft or sleeve 70 so as to prevent lateral displacement and preserve initial alinement of the several disks. A thicker washer or collar 71 serves to space the two indexes, and the disks are held to position by being clamped between the heads 72 screwed into or upon opposite ends of the shaft or sleeve 70. Each disk 68 of the two indexes corresponds with and represents one circumferential series of divisions of the charted index of the prior machine, and its periphery is cut away or notched to form a series of stepped bearings 73 each at a distance from the axis of rotation of the mechanical index as many units of movement of valve 33 or 34 as are represented by the figure contained in the corresponding section of the charted index.

It will be remembered that each longitudinal section of the charted index comprises a circumferential series of divisions each containing two numerals 1 to 15 of which one pertains to the upper and the other to the lower row of justification keys, thereby indicating the value of the dimensioning punch to be operated in conjunction with each designating punch. In the present instance the readings of each section of the charted index are divided, those pertaining to the upper row of justification keys and requiring coaction of designating punch bar 4 being embodied in the mechanical index 61, and those pertaining to the second row of keys and calling into action punch bar 5 being embodied in index 62.

The bearings 73 of the two indexes 61 and 62 are precalculated with relation to two movements at right angles derived from or measured by the line measuring and justifying space mechanisms of the keyboard, and they each represent by their position and elevation the unoccupied space in the line divided by the number of justifying space type expressed in units of the two justifying mechanisms, the one represented by unit movements of valve 33 and the other by unit movements of valve 34. In the preferred form of embodiment illustrated the space movement is transmitted to the automatic reader while the line measuring movement directly affects the mechanical index and is provided for as follows:—The index carrier 17 is connected through gearing 74 with a motor piston 75 working in cylinder 76 the latter connected by pipe 77 with a port 78 in motor cylinder 10. The port 78 sustains such relation to the motor piston that at a predetermined point in the advance movement of the latter and as it approaches the end of the line, pressure from the motor cylinder will be admitted to cylinder 76, to advance the index carrier with the line measuring devices. The index carrier is returned to and held normally in initial or zero position by a retracting spring 79 and stop pin 80, the latter abutting against an adjustable stop 81 which serves to regulate said zero position.

To regulate the starting movement of the index and thereby measure, proportionally, the deficiency of the line, i. e., the space remaining to be filled by justification, motor rack 12, whose measured advance is proportional to the space occupied in the line, is equipped with an abutment or shoulder 82 located in position to be engaged by an arm 83 carried by the index actuating devices and operating to arrest and thus gage the movement of the latter when advanced by the supplemental motor. It is necessary that abutment 82 should occupy a position in advance of arm 83 at the time pressure is admitted to cylinder 76, and as this action takes place only during the last part of the traverse of the motor-rack 12, the range of motion of the latter being in excess of the index driving rack 85 coupled with piston 75, provision is made whereby said abutment may freely pass arm 83 during its forward motion and be brought into position to engage said arm immediately the port 78 is uncovered and pressure admitted thereto. To this end the arm 83 is pivotally attached to the rack bar 85, as by means of a sleeve 86 surrounding a cylindrical portion of the rack-bar, and held to position thereon between collars or shoulders, and is provided with a spring or equivalent means for yieldingly sustaining it in position in the path of the abutment. In the illustration the spring 87 surrounds the bearing 88 which supports one end of rack bar 85 and has one end secured to an adjustable collar 89 and the opposite end to an arm 90 bearing a rod 91, the latter being received in an opening in lug 92 on sleeve 86. The abutment 82 has its front edge inclined so that as it passes arm 83 during the forward motion of motor-rack 12 said arm will be displaced laterally until it finally passes the abutment and swings back into line therewith in position to intercept the forward motion of the index mechanism.

In order to properly coördinate the action of the index mechanism with that of the line measuring mechanism it is desirable that adequate provision should be made for adjustment both with respect to the initial or zero position of the index and the relation between the gaging members represented by abutment 82 and arm 83. The adjustment for zero position has been explained, and a simple and competent means for adjusting the line gaging members is illustrated in Fig. 19 as applied to the abutment 82, the latter being provided with a body portion seated within a longitudinal recess in the motor rack 12 with its engaging shoulder projecting through an opening. The abutment block, is held to position by a clamping screw 93, and two conical pointed screws 94, the latter engaging opposing surfaces on the block and serving to accurately position the latter longitudinally of the motor rack. The return of the motor rack incident to the resetting of the machine after the measurements for a line have been made and the signals appertaining thereto completed is permitted by the withdrawal of arm 83 from the path of abutment 82, which can be effected by a direct manipulation of said arm, or preferably, through the medium of a motor 95 whose piston rod 96 is slotted to receive a pin 97 on arm 90, the latter transmitting motion to the arm 83 through rod 91.

Where, as in the illustration, a plurality of justification signals are required, and the mechanical indexes are simultaneously adjusted, means should be provided for locking the index in adjusted position while the signals are being successively produced. This is accomplished, so far at least as the index adjusting mechanism is concerned, by providing the index carrier 17 with peripheral teeth 98 and pivoting a holding pawl 99 on the frame in position to interlock with said teeth when moved into contact therewith. A spring 100 serves to hold the pawl normally out of engagement with the carrier, and it is advanced into engagement therewith through the medium of a motor 101 to whose piston it is coupled. After the adjustment of the index has been effected, the motor is energized to lock the carrier and so maintain it while the successive justification signals are produced.

The automatic reader operates in conjunction with the mechanical index to interpret its signals and express them in graduated movements of the valve 33 or 34 pertaining thereto.

It will be remembered that each of the series of disks 58 of the index contains a series of bearings 73 graduated to represent the justification units to be added to each of a given number of space type, to fill the line, the number of space type being determined by the position of the disk in the series, and the number of units of justification by the distance of the bearing from the datum line, corresponding to the degree of rotation of the index in measuring the last section of the line. Opposite, or in fixed relation to the datum line of each index and parallel with the axis thereof is mounted a longitudinally movable bar 102 provided with a rack-bar 103 in engagement with a pinion 104 on the shaft of the space ratchet 18, whereby said bar is caused to advance each time a justifying space signal is produced, after the manner of the index pointer of the prior machine. Upon the bar 102 is mounted two feelers 105, 106, one for each index, said feelers being supported in brackets 107 secured to the bar and maintained in position to be advanced into engagement with and thus gage the height of the bearings 73 presented thereto. A spring 108 serves to hold each feeler normally retracted and out of range of the index, so as not to interfere with the movements of the latter or of the feelers. Opposite the rear end of each feeler and in position to engage and advance the latter is a pusher 109 whose operating face is in parallel with the bar 102 and of sufficient extent to accommodate the lateral adjustment of the feeler. The two pushers 109 are pivotally supported, the one upon shaft 110 and the other upon a sleeve 111 surrounding said shaft, and each is coupled through a lever 112 with one of the valves 33 or 34 so that when force is applied in a direction to move the valve from normal to zero position, the feeler will be advanced until it contacts with that bearing 73 of the mechanical index at the time opposite its engaging end, thus gaging the movement of the valve to bring its port 40 opposite the duct 35 corresponding with the indicated justification dimensioning punch, so that when the key 60 pertaining to the valve is operated the dimensioning as well as the designating signals (in the event two justification signals are required) will be produced. Any means suitable for the purpose may be utilized for successively advancing the valves, but in the preferred embodiment shown each valve is provided with a motor 113 having its piston coupled with the valve stem, with an adjusting screw 114 for adjusting the initial position of the valve.

The space key ratchet mechanism is provided in addition to its driving and holding pawls, with two pawls 115, 116, both pivotally supported at 117 the former serving as a locking pawl to prevent overthrow, to which end it is engaged by a pin 118 on the driving pawl arm, said pin acting on the tail of the pawl in opposition to the retracting spring 119 to cause its point to engage reversed ratchet teeth at the instant the operating pawl completes its throw; while the other pawl 116 is provided with a motor 120 through which it can be thrown and held in engagement with the ratchet wheel, to sustain bar 102 in adjusted position while the resetting of the line measuring devices is going on, as hereinafter explained.

A resetting of the line measuring mechanism is effected at the conclusion of each line of composition by the depression of the resetting key controlling valve 24, to the end that the next succeeding line may be measured; and advantage is taken of the fact to automatically effect the adjustment of the selective system through valves 33, 34, concurrently with this resetting action and through the same controlling devices, thereby effecting a great saving in time. To this end the motors 120, 113, 95 and 101 are connected by pipes 121 with the motor return cylinder 11 and port 122 of the resetting valve, so that when said valve is shifted, to place the motor port 123 in communication with the exhaust and uncover and admit pressure through port 122, the index carrier 17 and space ratchet 18 will be locked, the gaging arm 83 withdrawn from the path of abutment 82, the holding pawls 14 and 19 operated to release the units wheel and space ratchet, so that the motor return may operate to restore the line measuring devices to position, and the valves 33, 34, advanced to the positions designated by the mechanical indexes. So long as the valve 24 remains in this position the adjustments of the mechanical indexes and the feelers of the automatic reader will be maintained, hence to complete the justification signal or signals and close the line, it is only required that the operator should press the justification keys 60 successively, to shift their valves 56 and thus through the selective system produce the required justification signals. The justification perforations having been formed in the manner described valve 24 is released, and, returning to initial position, reverses pressure in the motor and motor-return cylinders, at the same time effecting the withdrawal of the holding pawls from the carrier 17 and space ratchet 18. The carrier is then free to be returned to initial position by its spring, but not so the bar 102 of the automatic reader, as the return of the piston of tripping motor 20 incident to the withdrawal of pressure, would permit reëngagement of the holding pawl 19. To guard against this, means are provided whereby the holding pawl is retained out of engagement until the return of the feeler bar 102 after the withdrawal of locking pawl 116.

Surrounding the end of the cylinder of tripping motor 20 is a sleeve 123ˣ notched, as at 124 for the reception of the arm 125 which latter actuates holding pawl 19 and provided with a shoulder 126 in position to pass under said arm when advanced. The bar 102 is provided with a lug 127 which, when said bar is in its lowest or retracted position, bears against an arm 128, on sleeve 113 to retract the latter against the pressure of its spring 129, and thus withdraw shoulder 126 from arm 125. The elevation of bar 102 in response to the space key withdraws lug 127 and permits the spring to press shoulder 126 toward arm 125 so that when said arm is advanced, to trip pawl 19, shoulder 126 will pass beneath and sustain it in its advanced position until withdrawn by the reëngagement of lug 127 with arm 128, which action takes place immediately the holding pawl is withdrawn in the manner hereinbefore explained.

Having thus described my invention, what I claim as new and desire to secure by Letters Patent, is:—

1. In a composing machine such as described provided with a series of character and space signal producing devices and line measuring mechanism, and in combination therewith, an automatic justification signal selecting mechanism including the following elements, to wit; a mechanical index provided with a plurality of series of stepped bearings; an automatic reader whose range of movement is determined by said index; means controlled by the line measuring mechanism and the space signal devices for determining the relative positions of the index and reader; and a signal selecting system controlling the character signal producing devices and in turn controlled by the reader, to select that one of a series of members corresponding to the justification fraction for the composed line.

2. In a composing machine such as described, the combination with the means for producing character and space signals and for measuring the aggregate width thereof, of an automatic justification signal selecting mechanism coöperating with the character signal producing devices and comprising a mechanical index provided with a plurality of series of stepped bearings; means for advancing said index from a normal or zero position; means controlled by the line measuring devices for arresting the movement of the index, to gage the deficiency of the line; an automatic reader movable in a direction transverse to that of the index and coupled with the space signal producing devices to present the reader to different sections of the index; and a justification signal selecting system controlled by the reader and provided with a plurality of signal selecting means serially arranged in the order of the values represented thereby and a selector movable longitudinally of said series of signal selecting means.

3. The combination with a composing machine such as described of a selecting system for the justification dimensioning punches comprising a plurality of ports serially arranged, a pressure chamber and means for successively uncovering the ports to admit pressure.

4. In a composing machine such as described, the combination with the justification signal dimensioning devices, of a selecting system therefor comprising a plurality of ports, one for each dimensioning signal, serially arranged, and a movable member for successively uncovering said ports provided with means for admeasuring its movements.

5. In a composing machine such as described, provided with a plurality of dimensioning signal producing means representing progressively increasing values, and in combination therewith, a plurality of ports, one for each signal device, serially arranged in the order of their value, a movable member controlling the admission of pressure to said ports, and means for admeasuring the excursions of said movable member, to bring into action the signal device corresponding in value with the movement thereof.

6. In a composing machine such as described the combination with a plurality of signal producing devices representing progressively increasing values and each provided with a motor, of a selective system including a plurality of ports, one for each motor, serially arranged; and a valve provided with an inlet port movable longitudinally of the series of ports, to uncover the one corresponding in value to the admeasured traverse of the valve.

7. In a composing machine such as described provided with dimensioning signal devices and a designating signal device, and in combination therewith, a series of ports, one for each dimensioning signal; a movable member common to the series of ports and arranged to uncover that one in the series corresponding with the adjusted position of said member; a pressure supply and means common to the dimensioning and designating signal devices for simultaneously admitting pressure to actuate both said devices.

8. In a composing machine such as described provided with dimensioning and designating signal devices, and in combination therewith, a signal selecting system including the following elements, to wit; a valve chamber provided with a plurality of ports, one for each dimensioning signal, serially arranged in the order of the value of the dimensioning signals controlled thereby; a valve movable lengthwise of the series of ports and provided with an inlet port to register with or uncover any one of the signal ports corresponding with its position of adjustment; and a pressure supply duct communicating with said valve chamber and with the actuating motor of the designating signal device.

9. In a composing machine such as described, provided with a graded series of dimensioning signal devices and a plurality of designating signal devices, and in combination therewith, two valve mechanisms each provided with a plurality of ports controlling the dimensioning signal devices, and with a valve movable lengthwise of the series of ports and adapted to open the latter successively, and two pressure supply ducts, each communicating with the actuator of one designating signal device and the corresponding dimensioning signal valve mechanism.

10. In a composing machine such as described provided with dimensioning and designating signal devices and in combination therewith the following elements, to wit; two series of control ports, one for each series of dimensioning signals, with the corresponding ports in the two series communicating with the same dimensioning signal device; a valve for each series of ports adapted to successively uncover the latter; and a pressure supply duct connecting each valve with one of the designating signal devices.

11. In a composing machine such as described provided with dimensioning and designating signal devices and in combination therewith the following elements, to wit; two series of control ports with corresponding members connected to the same dimensioning signal device; a valve for each series of ports, for opening that one corresponding in position to the movement of the valve; two pressure supply ducts one for each valve and communicating with the designating signal device corresponding thereto; and means controlling the admission of pressure in said supply ducts.

12. In a composing machine such as described, and in combination with the dimensioning and designating signal devices thereof, the following elements, to wit; two series of control ports for said dimensioning signal devices; two valves, one for each series of ports, adapted to open that one in the series corresponding to the position of the valve; means for measuring the position of each valve; two pressure supply ducts, each communicating with one valve and the corresponding designating signal producing device; and means for separately controlling the admission of pressure in said supply ducts.

13. In a composing machine such as described, the combination with the dimensioning and designating signal devices, of a selecting system therefor, including two movable members, each controlling lines of communication between a common source of pressure and the individual dimensioning signal devices, to selectively designate by its movements of adjustment any desired signal device; means for admeasuring successive adjustments of said movable members; separate line of communication between the pressure supply and each designating signal device; and a plurality of actuating devices each controlling the admission of pressure to the selected dimensioning signal device and to one of the designating signal devices.

14. In a composing machine such as described, the combination with the keyboard and the ducts or passages leading therefrom to the dimensioning devices or punches, of a bar or frame detachably secured to the keyboard and provided with a valve chamber; a series of ducts communicating at one end with those of the dimensioning devices and at the other with ports serially arranged in said chamber; a slide valve within the chamber covering said ports and provided with an inlet port; and a pressure supply connection for said valve chamber.

15. In a record strip composing machine provided with a series of punches and means for selectively actuating the members thereof, and in combination therewith, two punch selecting members each controlling a plurality of said punches and acting to bring them serially into operative relation with power dissimultaneously effecting the operation of actuating means; two special punches; and means for the two selected punches in conjunction with one of said special punches.

16. In a composing machine such as described, the combination of the following elements, to wit; a series of ports, each designating a different signal; a valve controlling said ports and operating to open or uncover them sequentially; a motor for said valve; and admeasuring devices for varying the excursions of the valve; to selectively open the port corresponding with the measured movement thereof.

17. In a composing machine such as described the combination of the following elements, to wit; two valve mechanisms, each provided with signal selecting ports serially arranged and a valve operating to sequentially open or uncover said ports; independent motors for the two valves; and an admeasuring device for each valve, to gage its traverse and thus designate the signal.

18. In a composing machine such as described the combination of the following elements, to wit; a plurality of valves, each controlling a plurality of ports sequentially arranged in the order of the value of the signal devices connected therewith; a motor and an admeasuring device for each valve; control devices for the motors; and independent control devices for admitting pressure to the port selected by the valve, to produce the signal designated thereby.

19. In a composing machine the combination of the following elements to wit; a valve controlling a plurality of ports disposed sequentially in the order of the value of the signals pertaining thereto; a motor and admeasuring means for shifting said valve, to open or uncover any port in the series; control devices for the motor; and control means for the signal devices selectively designated by the valve.

20. In a composing machine such as described, provided with signal producing and line measuring mechanisms, and in combination with the resetting devices therefor, a motor controlled by the resetting devices; a valve actuated by said motor, to sequentially open or uncover a series of ports each controlling a signal producing device; means for admeasuring the movement of said valve; and means for admitting pressure to the signal producing devices through the port selected by the valve.

21. In a composing machine provided with line measuring and space registering mechanisms and a plurality of dimension signal selecting devices each controlling a series of signal indicating devices and in combination therewith a plurality of gaging devices each including the following elements to wit: an index and feeler relatively movable in two directions; connections between said gaging device and the line measuring and space registering mechanisms for effecting simultaneous adjustment thereof; and a connection between the feeler and its dimension signal selecting device for advancing the latter relative to its series of signal indicating devices to the position designated by the index.

22. In a composing machine such as described provided with line measuring mechanism, including a motor, and in combination therewith, an index carrier, a motor therefor controlled by the first named motor, a gaging member coupled with the line measuring devices, and an opposing gaging member coupled with the index carrier to measure the movement of the latter.

23. In a composing machine such as described, the combination with the motor for the line measuring mechanism, of an index carrier, a motor therefor, a port in the cylinder of the first named motor located beyond the piston thereof when retracted and communicating with the carrier motor, a gaging member coupled and moving with one motor, and an opposing gaging member coupled and moving with the carrier.

24. In a composing machine such as described the combination with the line measuring motor and its piston, of a second motor; an inlet port for said last named motor located in the cylinder of the first named motor and uncovered by the latter at a predetermined point in its stroke, to admit pressure to the second motor; a gage block or abutment coupled with the piston of the first motor; and an opposing gaging member coupled with the second motor.

25. In a composing machine such as described, the combination with the motor cylinder, piston and rack which actuates the line measuring mechanism, of a supplemental motor coupled with a reciprocating member in parallel with the motor rack, an abutment or gage on the motor rack, and an opposing gaging member carried by said reciprocating member and adapted to move laterally from the path of the first named gaging member, to pass the latter.

26. In a composing machine such as described, the combination with the motor for the line measuring mechanism, its piston and rod or motor rack, of a supplemental motor coupled with and actuating the index carrier, a pressure supply port for the supplemental motor communicating with the cylinder of the first named motor and opened during the advance of its piston, a gage block or abutment coupled and reciprocating with the first named motor, and an opposing gaging member coupled with the piston of the supplemental motor, said two gaging members being arranged to reciprocate in the same plane but capable of relative lateral movement, to permit passing in one direction.

27. In a composing machine such as described, the combination with the motor and motor-rack of the line measuring mechanism of the following elements, to wit; a supplemental motor with its piston rod in parallel relation to the motor-rack; an inlet port located near the front end of the motor cylinder and communicating with the supplemental motor; a gage block carried by the motor-rack and provided with a deflecting surface or incline on its front face; and a laterally movable arm or gaging member carried by the piston rod of the supplemental motor, in the path of the motor rack gage block.

28. In a composing machine such as described, the combination with a line measuring mechanism provided with a motor and a reciprocating member coupled therewith and a gaging shoulder with a deflecting front face or incline, of an auxiliary motor coupled with a reciprocating member, the latter provided with a pivoted arm normally in the path of said gaging shoulder.

29. A detachable mechanical index for composing machines such as described comprising a series of circumferentially stepped disks separated by washers and threaded upon a support, the latter provided with centering devices at its extremities.

30. A detachable mechanical index for composing machines such as described comprising a splined shaft, a series of peripherally stepped disks with interposed washers, and clamping devices or heads applied to the shaft and provided with centering appliances.

31. In a composing machine such as described and in combination with the index carrier thereof, a mechanical index mounted upon said carrier and provided with center bearings engaging said carrier and an opposing bearing on the frame.

32. In a composing machine such as described and in combination with the line measuring mechanism thereof, a rotary index carrier, means for actuating and gaging the motion of said carrier, to measure the deficiency of the line, and a mechanical index detachably coupled with said carrier and axially supported between opposing bearings on the carrier and frame.

33. In a composing machine such as described, the combination of the following elements, to wit; a mechanical index coupled with the line measuring mechanism and provided with a plurality of series of stepped bearings in parallel relation; a reader provided with a reciprocatory feeler for contacting with the index bearings to measure their heights, said feeler being movable laterally of the series of index bearings and coupled with the space registering devices; means for advancing the feeler into contact with the index bearings at the time in position; and a punch selecting system provided with a movable selecting member coupled with the feeler actuating devices, to admeasure the movement of said selecting member.

34. In a composing machine such as described, the combination of the following elements, to wit; two mechanical indexes coupled with the line measuring mechanism and each comprising a plurality of parallel series of stepped bearings; a reader for each index comprising a reciprocating feeler coupled with the justification space registering devices and movable laterally of the series of index bearings; means for disimultaneously advancing the feelers, to contact with the bearings of their indexes; and two punch selecting systems each provided with a movable selecting member coupled with one of the feelers, to gage the advance of said selecting member by the index bearing opposed to the feeler.

35. In a composing machine such as described, the combination of the following elements, to wit; a revoluble mechanical index coupled with line measuring mechanism and provided with a plurality of stepped bearings disposed in parallel series in the direction of rotation; a reader provided with a feeler adapted to contact with the index bearings and movable in two directions one parallel with the axis of the index and the other radial thereto; means controlled by the space registering mechanism for advancing the feeler in a direction parallel with the axis of the index; a series of dimensioning signal producing devices controlled by a selective member; and means for connecting the feeler with said selective member, to gage the position of the latter.

36. In a composing machine such as described, the combination of the following elements, to wit; a mechanical index coupled with the line measuring mechanism and provided with a plurality of stepped bearings disposed in parallel series running in the direction of the movement measured by the line measuring mechanism; a reader provided with a feeler movable transversely of the index and perpendicular to the planes of the several series of index bearings; means coupled with the space registering devices for shifting said feeler; a series of dimensioning signal producing devices controlled by a reciprocatory selective member common to the series; means for connecting the said selective member with the feeler; and means for advancing the feeler into contact with the index bearing presented thereto, to admeasure the traverse of the selective member.

37. In a composing machine such as described, the combination of the following elements, to wit; a revoluble mechanical index controlled by the line measuring mechanism and provided with a plurality of bearings of different elevations arranged in parallel series; a longitudinally movable bar parallel with the axis of the mechanical index and carrying a feeler movable radially of the index, said bar being controlled by the space registering devices; a plurality of signal designating means selectively controlled by a reciprocating member; and a pusher for the feeler coupled with said reciprocating member.

38. In a composing mechine such as described, the combination of the following elements, to wit; a revoluble mechanical index controlled as to position, by the line measuring devices, and provided with two sets of circumferential bearings in parallel planes; a longitudinally movable bar in parallel with the axis of the index and coupled with the space registering devices; two feelers, one for each series of bearings, carried by said bar and movable radially of the index; independent pushers for said feelers; two valves, each coupled with one of the pushers and controlling a series of dimensioning punches; a motor for each valve; two designating punches, one for each valve; and means for actuating each designating punch in conjunction with the dimensioning punch selected by its valve.

39. In a composing machine such as described the combination with a rotary mechanical index controlled by the line measuring mechanism and provided with two sets of stepped circumferential bearings, of a reader comprising feelers supported to reciprocate radially of the index on a bar connected to the space registering devices and movable parallel with the axis of the index; means for dissimultaneously advancing said feelers; and signal selecting means coupled with said feelers and controlling signal designating means serially disposed.

40. In a composing machine such as described, the combination with the line measuring and space registering mechanisms and the resetting devices for releasing and returning the line measuring mechanism, of the following elements, to wit; an index carrier controlled by the line measuring mechanism and provided with a locking device; means for locking the space registering devices; a mechanical index; a reader provided with a reciprocating feeler; a signal selecting system controlled by the reader and provided with a motor; and means connecting said resetting devices, motor and locking devices, whereby in actuating the resetting devices the locking devices are caused to act and the motor of the reader is energized to adjust the signal selecting system in accordance with the reading of the index.

41. A composing machine such as described provided with a series of punches, means for selectively actuating the punches to produce type signals, line measuring mechanism and a space registering device, and in combination therewith, the following elements, to wit; a mechanical index coupled with the line measuring mechanism and provided with a plurality of series of bearings in parallel relation, the several series being arranged in sequence corresponding with the number of space type, and the members of each series graded in two directions at right angles, to represent, by their position, the deficiency of the line, and by their elevation, the number of justification units to be added to the space type; an automatic reader movable laterally of the series of index bearings, controlled, as to position, by the space registering devices, and operating to gage the dimension of the bearing opposed thereto; and a justification punch selecting system provided with a movable member coupled with the reader and operating to selectively designate that one of the series of dimensioning punches whose value corresponds with the degree of motion of said movable member.

42. A mechanical index for composing machines such as described provided with a plurality of series of bearings in parallel relation and consecutively disposed in the order of the number of spaces to be dealt with, the bearings of each series being spaced to correspond with the unit of line measurement, and graduated in height proportionally to the number of justification units indicated by their distance from the common datum line divided by the numerical value of the series in which they are contained.

43. A composing machine such as described provided with a series of punches, means for selectively operating said punches to form type signals, a line measuring mechanism, and a space registering mechanism, and in combination therewith, the following elements, to wit; a mechanical index controlled by the line measuring mechanism; an automatic reader connected with the space registering mechanism and operating to convert the index readings into graduated motion; and a punch selecting system controlled by said reader and operating to bring into action a punch corresponding in value with the degree of motion determined by the index.

44. In a composing machine such as described provided with a series of punches, including a justification designating punch, means for selectively operating the punches to produce type signals, a line measuring mechanism and a space registering mechanism, and in combination therewith, the following elements, to wit; two mechanical indexes controlled by the line measuring mechanism; an automatic reader for each index coupled with the space registering mechanism, for adjustment with relation to the bearings of its index; a punch selecting system for each reader provided with a movable selecting member controlled by its reader; and means for successively actuating the selected punches each in conjunction with one of the justification designating punches.

45. In a composing machine such as described provided with a series of punches including justification designating and dimensioning punches, means for selectively operating the punches to produce type signals, a line measuring mechanism, and a space registering mechanism, and in combination therewith, the following elements, to wit; two mechanical indexes controlled by the line measuring mechanism; automatic readers coupled with the space registering mechanism; two valves each coupled with one of the automatic readers and controlling the actuating devices of a series of dimensioning punches, to select the one designated by the index; two motors, one for each reader and the valve coupled therewith, a control valve for said motors; and two valves, one for each reader valve, controlling the admission of pressure to the actuating devices of the selected dimensioning punch and one of the designating punches.

46. In a composing machine such as described, the combination of the following elements, to wit; a series of punches with means for selectively operating the same to form type signals; a mechanical index controlled by the line measuring mechanism; an automatic reader controlled, as to position, by the space registering mechanism; a valve selectively controlling the transmission of pressure to the actuating devices of a series of punches, said valve being coupled with the reader and serving to designate the punch indicated by the index; a motor for the valve and reader; and a valve controlling the admission of pressure to the actuating devices of the selected punch.

47. In a composing machine such as described, the combination of the following elements, to wit; a series of punches with means for selectively operating the same to form type signals; a line measuring mechanism coupled with two mechanical indexes; an automatic reader for each index controlled as to position by the space registering mechanism; a valve for each reader selectively controlling the transmission of pressure to the actuating devices of a series of punches, said valve being coupled with its reader and designating the punch indicated by the index; motor actuated locking devices for the indexes and readers; a motor for each selecting valve; a key controlling said valve and locking motors; and two valves, corresponding with the indexes, each controlling the admission of pressure to the punch actuating devices selected by its index and to those of the designating punch corresponding therewith.

48. In a composing machine the combination with the actuating and retaining devices for the space registering mechanism, of a tripping member for said actuating and retaining devices, and a locking member for retaining the registering mechanism in adjusted position, said locking member being coupled with the resetting devices in a manner to effect its engagement with the registering mechanism when the resetting devices are brought into action.

49. In a composing machine the combination with the actuating and retaining devices for the space register, of a tripping device provided with a lock for retaining it in its advanced or releasing position.

50. In a composing machine the combination with a space registering mechanism provided with actuating and retaining members, and a bar coupled with said registering mechanism, of a tripping device for said actuating and retaining members, a lock for retaining the bar in adjusted position, and a lock for the tripping device.

51. In a composing machine the combination with the space registering devices coupled with the feeler-bar and provided with actuating and retaining members, of a motor controlled tripping device for disengaging the actuating and retaining members, a motor controlled lock for the registering devices, and a lock for the tripping device, the last named lock being withdrawn by the return of the feeler rack incident to the release of the lock for the registering devices.

52. In a composing machine such as described the combination with the space registering device controlling the feeler bar and provided with actuating and retaining members, and a tripping member, of a lock for said registering mechanism acting in unison with the tripping member to lock the registering devices in adjusted position while the actuating and retaining members are withdrawn, an automatic lock for said tripping member operating to retain the latter in advanced position, and means controlled by the feeler bar for releasing said lock upon the return of said bar.

53. The combination with a composing machine provided with character and space signal producing means and line measuring mechanism of an automatic justification signal selecting mechanism including the following elements, to wit, a signal selecting system provided with a plurality of signal selecting means serially arranged in the order of the values represented thereby and a selector movable longitudinally of said signal selecting means; a mechanical index; a reader for said index coupled with the selector and controlling the range of its movement; and means governed by the line measuring and spare signal devices for controlling the relative positions of the index and reader.

54. In a composing machine provided with line measuring devices, space registering devices, and automatic justification signal selecting devices, the latter coupled with the space registering and line measuring devices and in combination therewith means for simultaneously resetting the line measuring devices and locking the space register and signal selecting devices.

55. In a composing machine provided with line measuring devices, space registering devices, automatic signal selecting devices and means for actuating the selected signal and in combination therewith controlling devices for said signal actuating means, means for simultaneously locking and holding the space registering and signal selecting devices in adjusted position, and means for resetting the line measuring devices and actuating said locking and holding devices.

TOLBERT LANSTON.

Witnesses:
JOSEPH B. CHURCH,
THOMAS DURANT.